(12) United States Patent
Blacker et al.

(10) Patent No.: US 7,648,769 B2
(45) Date of Patent: *Jan. 19, 2010

(54) COATED ARTICLE WITH LOW-E COATING HAVING ABSORBING LAYER DESIGNED FOR DESIRABLE BLUISH COLOR AT OFF-AXIS VIEWING ANGLES

(75) Inventors: Richard Blacker, Farmington Hills, MI (US); Anton Dietrich, Fontnas (CH); Jose Ferreira, Rumelange (LU); Jens-Peter Muller, Differdange (LU); Pierre Pallotta, Villerupt (FR); Jean-Marc Lemmer, Blaschette (LU)

(73) Assignees: Guardian Industries Corp., Auburn Hills, MI (US); Centre Luxembourgeois de Recherches pour le Verre et la Ceramique S.A. (C.R.V.C.), Grand Duche de Luxembourg (LU)

( * ) Notice: Subject to any disclaimer, the term of this patent is extended or adjusted under 35 U.S.C. 154(b) by 22 days.

This patent is subject to a terminal disclaimer.

(21) Appl. No.: 11/898,078

(22) Filed: Sep. 7, 2007

(65) Prior Publication Data
US 2009/0068447 A1 Mar. 12, 2009

(51) Int. Cl.
*B32B 17/06* (2006.01)
(52) U.S. Cl. .................. 428/432; 428/426; 428/428; 428/434; 428/446; 428/448; 428/697; 428/698; 428/701; 428/702; 428/699; 428/704
(58) Field of Classification Search ............... None
See application file for complete search history.

(56) References Cited

U.S. PATENT DOCUMENTS

| 6,576,349 | B2 | 6/2003 | Lingle et al. |
| 6,863,928 | B2 | 3/2005 | Stachowiak |
| 7,081,302 | B2 | 7/2006 | Lemmer et al. |
| 2003/0049464 | A1 | 3/2003 | Glenn et al. |
| 2003/0150711 | A1 | 8/2003 | Laird |
| 2004/0005467 | A1 | 1/2004 | Neuman et al. |
| 2005/0123772 | A1 | 6/2005 | Coustet et al. |
| 2005/0196622 | A1 | 9/2005 | Laird et al. |
| 2005/0202254 | A1 | 9/2005 | Nunez-Regueiro et al. |
| 2005/0202255 | A1 | 9/2005 | Lemmer et al. |
| 2006/0046074 | A1 | 3/2006 | Ferreira et al. |

OTHER PUBLICATIONS

U.S. Appl. No. 11/522,512, filed Sep. 18, 2006.

*Primary Examiner*—Ling Xu
(74) *Attorney, Agent, or Firm*—Nixon & Vanderhye P.C.

(57) ABSTRACT

An absorbing layer of a low-E coating is designed to cause the coating to have a more bluish color at normal and/or certain off-axis viewing angles. In certain example embodiments, the metallic or substantially metallic absorbing layer (e.g., NiCr) is located in the middle section of the layer stack and has been found to unexpectedly provide desirable bluish glass side reflective color for the coated article at certain off-axis viewing angles (e.g., at a 45 degree off-axis viewing angle). In certain example embodiments, the absorbing layer is provided between first and second nitride inclusive or based layers in order to reduce or prevent oxidation thereof during heat treatment thereby permitting predictable coloration to be achieved following the heat treatment. Coated articles according to certain example embodiments of this invention may be used in the context of insulating glass (IG) window units, vehicle windows, other types of windows, or in any other suitable application.

17 Claims, 2 Drawing Sheets

COATED ARTICLE WITH LOW-E COATING HAVING ABSORBING LAYER DESIGNED FOR DESIRABLE BLUISH COLOR AT OFF-AXIS VIEWING ANGLES

This invention relates to a coated article including a low-E coating. In certain example embodiments, an absorbing layer of the low-E coating is designed to cause the coating to have desirable coloration at normal and/or certain off-axis viewing angles. In certain example embodiments, the coated article is heat treatable (e.g., may be thermally tempered), and the absorbing layer of the low-E coating is designed to cause the coating to have desirable bluish coloration at normal and/or certain off-axis viewing angles after the heat treatment (e.g., after tempering). In certain example embodiments, the absorbing layer is metallic, or substantially metallic, and is provided between first and second nitride layers (e.g., silicon nitride based layers) in order to reduce or prevent oxidation thereof during heat treatment (e.g., thermal tempering, heat bending, and/or heat strengthening) thereby permitting predictable coloration to be achieved following the heat treatment at multiple viewing angles. Moreover, in certain example embodiments, the coated article is heat treatable and the absorbing layer and the surrounding nitride based layers may be provided in a central portion of the layer stack between lower and upper infrared (IR) reflecting layers. Coated articles according to certain example embodiments of this invention may be used in the context of insulating glass (IG) window units, or in any other suitable window application.

BACKGROUND OF THE INVENTION

Coated articles are known in the art for use in window applications such as insulating glass (IG) window units, vehicle windows, and/or the like. It is known that in certain instances, it is desirable to heat treat (e.g., thermally temper, heat bend and/or heat strengthen) such coated articles for purposes of tempering, bending, or the like in certain example instances.

In certain situations, designers of coated articles often strive for a combination of desirable visible transmission, desirable color(s) at both normal and off-axis viewing angles, low emissivity (or emittance), and low sheet resistance ($R_s$). High visible transmission for example may permit coated articles to be more desirable in certain window applications, whereas low-emissivity (low-E) and low sheet resistance characteristics permit such coated articles to block significant amounts of IR radiation so as to reduce for example undesirable heating of vehicle or building interiors. However, heat treatment of coated articles typically requires use of temperature(s) of at least 580 degrees C., more preferably of at least about 600 degrees C. and still more preferably of at least 620 degrees C. The use of such high temperatures (e.g., for 5-10 minutes or more) often causes coatings to break down, have undesirable off-axis color values, and/or causes one or more of the aforesaid desirable characteristics to significantly deteriorate in an undesirable manner.

U.S. Patent Document 2005/0202254, commonly owned and hereby incorporated herein by reference, discloses a coated article having the following layers on a glass substrate, from the glass substrate outwardly.

Layer
Glass Substrate
$TiO_2$
$Si_3N_4$
ZnO
Ag
$NiCrO_x$
$SnO_2$
$Si_3N_4$
$SnO_2$
ZnO
Ag
$NiCrO_x$
$SnO_2$
$Si_3N_4$ While the aforesaid coated article is heat treatable, and has many desirable and good characteristics, it does have problems with reddish off-axis coloration at high off-axis viewing angles. For example, the Comparative Example of this discussed in Ser. No. 11/522,512 filed Sep. 18, 2006 (hereby incorporated herein by reference) had a reflective glass side coloration Rga* (45°) value of +5 which is very reddish at this off-axis viewing angle.

U.S. Patent Document 2005/0196622 discloses a coated article including a layer stack of silicon nitride, NiCr, silicon nitride, etc. in a bottom portion of the coating. However, 2005/0196622 does not disclose or suggest that the NiCr layer has any bearing on off-axis coloration. Moreover, it has been found that locating the NiCr absorbing layer below both IR reflecting layers is not desirable for certain off-axis coloration values desired herein.

In view of the above, it will be apparent to those skilled in the art that there exists a need in the art for a coated article with more desirable (e.g., less red and/or more green) off axis coloration.

BRIEF SUMMARY OF EXAMPLE EMBODIMENTS OF THE INVENTION

A coated article including a low-E coating. In certain example embodiments, an absorbing layer of the low-E coating is designed to cause the coating to have a more bluish (possibly coupled with slightly reddish) color at normal and/or certain off-axis viewing angles. In certain example embodiments, the metallic or substantially metallic absorbing layer (e.g., NiCr) is located in a position which surprisingly permits it to cause the coated article to realize a more bluish (possibly coupled with slightly reddish) color at certain off-axis viewing angles such as about a 45 degree off-axis viewing angle. Accordingly, the coated article does not appear too red, and instead realizes a more bluish color when viewed at off-axis viewing angles (e.g., at a 45 degree viewing angle) which is advantageous from an aesthetic perspective in certain applications.

In certain example embodiments, the metallic or substantially metallic absorbing layer is provided between first and second nitride layers (e.g., silicon nitride based layers) in order to reduce or prevent oxidation thereof during heat treatment (e.g., thermal tempering, heat bending, and/or heat strengthening) thereby permitting predictable coloration to be achieved following the heat treatment. The absorbing layer may be made of NiCr or any other suitable material in certain example embodiments. Coated articles according to certain example embodiments of this invention may be used in the context of insulating glass (IG) window units, vehicle windows, other types of windows, or in any other suitable application.

In certain example embodiments of this invention, there is provided a heat treated coated article including a coating supported by a glass substrate, the coating comprising: first and second infrared (IR) reflecting layers comprising silver, wherein said IR reflecting layers are spaced apart from one another by at least one dielectric layer that is located therebetween, and wherein the first IR reflecting layer is located closer to the substrate than is the second IR reflecting layer; a substantially metallic absorbing layer consisting essentially of NiCr located between the first and second IR reflecting layers, wherein the absorbing layer is sandwiched between and contacting first and second layers comprising silicon nitride; and wherein the substantially metallic absorbing layer is located in the coating so that the heat treated coated article has a glass side reflective a* color value of from about 0 to +2 at a 45 degree viewing angle from normal, and a glass side reflective b* color value of from about −10 to −4 at the 45 degree viewing angle from normal.

In other example embodiments of this invention, there is provided a coated article including a coating supported by a glass substrate, the coating comprising: first and second infrared (IR) reflecting layers, wherein said IR reflecting layers are spaced apart from one another, and wherein the first IR reflecting layer is located closer to the glass substrate than is the second IR reflecting layer; a substantially metallic absorbing layer located between the first and second IR reflecting layers, wherein the absorbing layer is sandwiched between and contacting first and second layers dielectric layers which are also located between the first and second IR reflecting layers; and wherein the substantially metallic absorbing layer is located in the coating so that the coated article has a glass side reflective a* color value of from about 0 to +2 at a 45 degree viewing angle from normal, and a glass side reflective b* color value of from about −10 to −4 at the 45 degree viewing angle from normal.

In other example embodiments of this invention, there is provided a coated article including a coating supported by a glass substrate, the coating comprising: at least first and second infrared (IR) reflecting layers, wherein said IR reflecting layers are spaced apart from one another, and wherein the first IR reflecting layer is located closer to the glass substrate than is the second IR reflecting layer; a substantially metallic absorbing layer located between the first and second IR reflecting layers, wherein the absorbing layer is sandwiched between and contacting first and second layers dielectric layers which are also located between the first and second IR reflecting layers.

DETAILED DESCRIPTION OF EXAMPLE EMBODIMENTS OF THE INVENTION

Coated articles herein may be used in applications such as IG window units, vehicle windows, monolithic architectural windows, residential windows, and/or any other suitable application that includes single or multiple glass substrates. In certain example embodiments of this invention, the coating includes a double-silver stack, although this invention is not so limited in all instances.

For example, in certain example embodiments of this invention, heat treated coated articles having multiple IR reflecting layers (e.g., two spaced apart silver based layers) are capable of realizing a sheet resistance ($R_s$) of less than or equal to 3.0 (more preferably less than or equal to 2.5, even more preferably less than or equal to 2.1, and most preferably less than or equal to 2.0). In certain example embodiments, following heat treatment and as measured in monolithic form, coated articles herein are capable of realizing a visible transmission (Ill. C, 2 degree) of at least about 40%, more preferably of at least about 50%. Moreover, in certain example embodiments, following heat treatment and coupling to another glass substrate to form an IG window unit, IG window unit coated articles according to certain example embodiments of this invention are capable of realizing a visible transmission of at least about 40%, more preferably of at least about 50%.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

Figure 1:
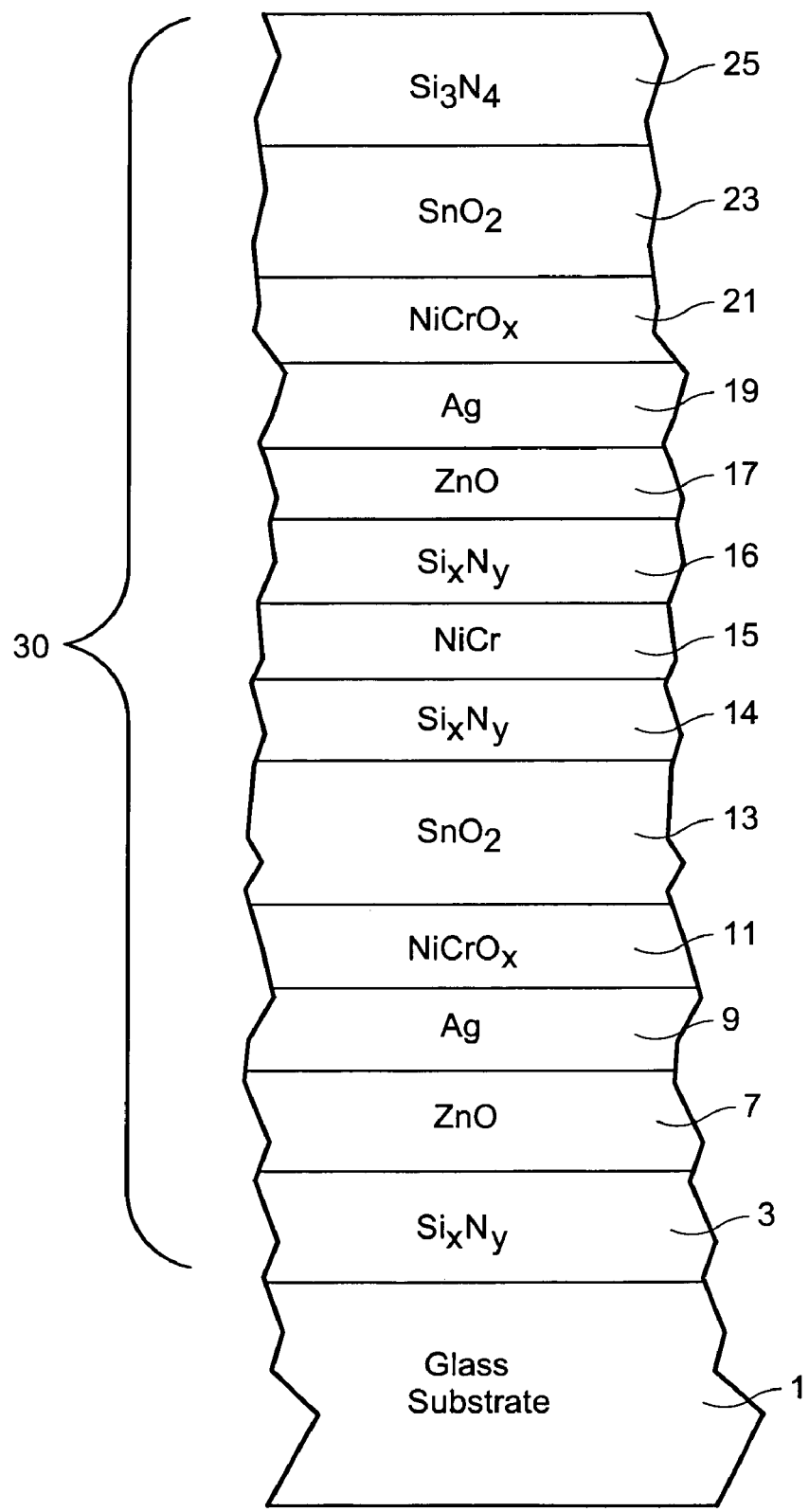
FIG. 1 is a cross sectional view of a coated article according to an example embodiment of this invention.

FIG. 1 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 6.0 mm thick), and low-E coating (or layer system) 30 provided on the substrate 1 either directly or indirectly. The coating (or layer system) 30 includes, for example: bottom dielectric silicon nitride layer 3 which may be $Si_3N_4$, of the Si-rich type for haze reduction, or of any other suitable stoichiometry silicon nitride in different embodiments of this invention, first lower contact layer 7 (which contacts bottom IR reflecting layer 9), first conductive and preferably metallic infrared (IR) reflecting layer 9, first upper contact layer 11 (which contacts layer 9), dielectric layer 13 (which may be deposited in one or multiple steps in different embodiments of this invention), another silicon nitride based and/or inclusive layer 14, metallic or substantially metallic absorbing layer 15 (e.g., of or including NiCr or the like), additional dielectric silicon nitride layer 16 which may be $Si_3N_4$, of the Si-rich type for haze reduction, or of any other suitable stoichiometry silicon nitride, second lower contact layer 17 (which contacts IR reflecting layer 19), second conductive and preferably metallic IR reflecting layer 19, second upper contact layer 21 (which contacts layer 19), dielectric layer 23, and finally protective dielectric layer 25. The "contact" layers 7, 11, 17 and 21 each contact at least one IR reflecting layer (e.g., layer based on Ag or Au). The aforesaid layers 3-25 make up low-E (i.e., low emissivity) coating 30 that is provided on glass or plastic substrate 1. It will be appreciated of course that other layers may also be provided, or certain layers may be omitted, and different materials may be used, in certain alternative embodiments of this invention.

In monolithic instances, the coated article includes only one glass substrate 1 as illustrated in FIG. 1. However, monolithic coated articles herein may be used in devices such as laminated vehicle windshields, IG window units, and the like. As for IG window units, an IG window unit may include two spaced apart glass substrates. An example IG window unit is illustrated and described, for example, in U.S. Patent Document No. 2004/0005467, the disclosure of which is hereby incorporated herein by reference. An example IG window unit may include, for example, the coated glass substrate 1 shown in FIG. 1 coupled to another glass substrate via spacer(s), sealant(s) or the like, with a gap being defined therebetween. This gap between the substrates in IG unit embodiments may in certain instances be filled with a gas such as argon (Ar). An example IG unit may comprise a pair of spaced apart clear glass substrates each about 3-4 mm thick, one of which is coated with a coating 30 herein in certain example instances, where the gap between the substrates may be from about 5 to 30 mm, more preferably from about 10 to 20 mm, and most preferably about 16 mm. In certain example instances, the coating 30 may be provided on the interior surface of either substrate facing the gap. In certain preferred embodiment, the glass substrate 1 shown in FIG. 1 may be the outer glass substrate of an IG window unit and the coating 30 may be provided on the interior surface of the outer glass substrate 1.

Absorption layer 15 is, in certain example embodiments of this invention, located between and contacting dielectric layers 14 and 16. In certain example embodiments, each of layers 14 and 16 surrounding the absorption layer 15 is a nitride layer and is substantially or entirely non-oxidized. This is advantageous in that it helps prevent (or reduce the likelihood of) the absorption layer from being oxidized during heat treatment, thereby better allowing the absorption layer to perform one of its intended functions, in particular absorbing at least some amount (e.g., at least 5%, more preferably at least 10%) of visible light. It will be appreciated that if a layer becomes too oxidized during heat treatment or the like, it no longer can function as an adequate absorption layer.

In certain example embodiments of this invention, absorption layer 15 may be of or include NiCr (any suitable ratio or Ni:Cr). In certain example embodiments, it is desired that the absorption layer 15 comprises from 0-10% oxygen, more preferably from 0-5% oxygen, and most preferably from 0-2% oxygen (atomic %). While NiCr is a preferred material for the absorption layer 15, it is possible that other materials may instead be used. For example, in certain other example embodiments of this invention, the absorption layer 15 may be of or include Ni, Cr, NiCrN$_x$, CrN, ZrN, or TiN. In non-heat treatable embodiments, any of the aforesaid materials may be used for the absorption/absorbing layer 15, as well as other materials such as Ti, Zr, NiOx or the like.

The absorbing layer 15 of the low-E coating is designed, based on its location, thickness and material to cause the coating to have a more bluish (possibly coupled with a slight red) color at certain normal and/or certain off-axis viewing angles. In certain example embodiments, the metallic or substantially metallic absorbing layer (e.g., NiCr) 15 is from about 3-150 angstroms (Å) thick, more preferably from about 5 to 120 angstroms (Å) thick. In a first alternative example embodiment of this invention (adapted for higher transmission), the metallic or substantially metallic absorbing layer (e.g., NiCr) 15 is from about 3-25 angstroms (Å) thick, more preferably from about 4 to 15 angstroms (Å) thick. In a second alternative example embodiment of this invention (adapted for lower transmission), the metallic or substantially metallic absorbing layer (e.g., NiCr) 15 is from about 80-130 angstroms (Å) thick, more preferably from about 95 to 125 angstroms (Å) thick. Unexpectedly, the location of the absorbing layer 15 in the middle section of the stack, has surprisingly been found to provide a more bluish color at normal and certain off axis viewing angles which is desirable in certain applications (e.g., at a 45 degree off-axis viewing angle). Accordingly, the coated article does not appear too red in color when viewed at off-axis viewing angles (e.g., at a 45 degree viewing angle), and instead appears fairly bluish which is highly advantageous from an aesthetic perspective.

Figure 2:
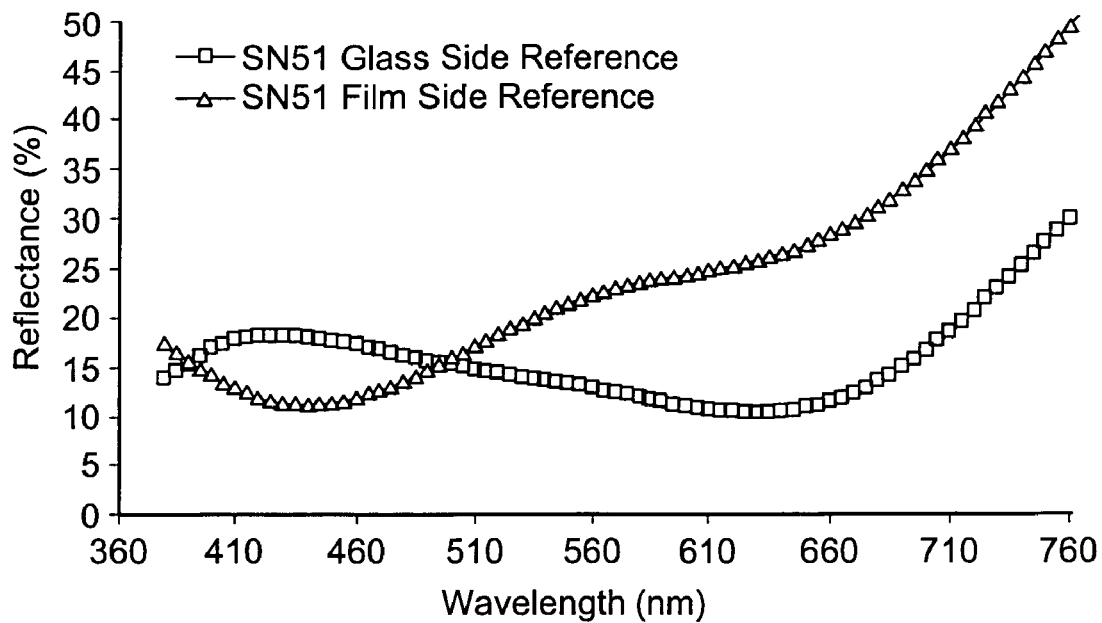
FIG. 2 is a graph illustrating reflectance spectra of a coated article according to an example embodiment of this invention having a relatively low visible transmission (e.g., see Example 1).
Figure 3:
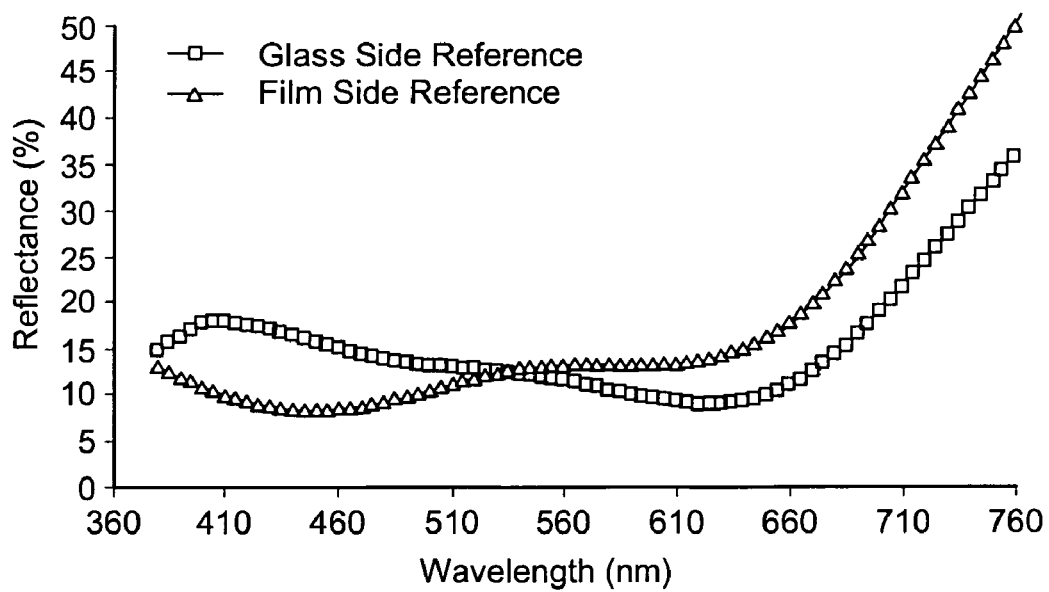
FIG. 3 is a graph illustrating reflectance spectra of a coated article according to an example embodiment of this invention having a relatively high visible transmission (e.g., see Example 2).

FIGS. 2 and 3 are graphs illustrating reflectance (%) vs. wavelength for the purpose of showing reflectance spectra according to example embodiments of this invention. FIG. 2 is a graph illustrating reflectance spectra of a coated article according to an example embodiment of this invention having a relatively low visible transmission (e.g., see Example 1 below), whereas FIG. 3 is a graph illustrating reflectance spectra of a coated article according to an example embodiment of this invention having a relatively high visible transmission (e.g., see Example 2 below). The glass side reflectance shown in FIGS. 2-3 is of particular interest, as it was capable of matching desired glass side reflectance spectra of non-HT companion coated glass sheets having different coatings. Moreover, the glass side reflectance spectra shown in FIGS. 2-3 of example embodiments of this invention is particularly advantageous (due to the location of the absorbing layer 15) in that it was able to realize its visible region valley in the region of from about 600-660 nm, and its visible region peak in the region of from about 400-460 nm. The region between the visible region peak and the visible region valley sloped substantially continuously downward toward the valley which was also desirable, as shown in FIGS. 2-3. The desirable spectral curves as shown in FIGS. 2-3, permits the coated articles to realize desirable glass side reflective color in the bluish (with possibly some slight red) at off-axis viewing angles such as about 45 degrees. Thus, it will be appreciated that FIGS. 2-3 illustrate the unexpected desirable glass side reflective spectra caused by the location, thickness and/or material of the absorbing layer 15, which translates into desirable off-axis glass side reflective color (e.g., bluish color) at high viewing angles such as about 45 degrees. As described in Ser. No. 11/522,512 (hereby incorporated herein by reference), if no absorbing layer 15 is provided in an example coating, the coated article has an undesirable too red color at a viewing angle of about 45 degrees.

In certain example embodiments, the metallic or substantially metallic absorbing layer 15 is provided between first and second nitride layers (e.g., silicon nitride based layers) 14 and 16 in order to reduce or prevent oxidation thereof during heat treatment (e.g., thermal tempering, heat bending, and/or heat strengthening) thereby permitting predictable coloration to be achieved following the heat treatment.

Dielectric layers 3, 14 and 16 may be of or include silicon nitride in certain embodiments of this invention. Silicon nitride layers 3, 14 and 16 may, among other things, improve heat-treatability of the coated articles, e.g., such as thermal tempering or the like. The silicon nitride of layers 3, 14 and/or 16 may be of the stoichiometric type (i.e., $Si_3N_4$), or alternatively of the Si-rich type in different embodiments of this invention. For example, Si-rich silicon nitride 3 (and/or 14, 16) combined with zinc oxide and/or tin oxide under a silver based IR reflecting layer may permit the silver to be deposited (e.g., via sputtering or the like) in a manner which causes its sheet resistance to be lessened compared to if certain other material(s) were under the silver. Moreover, the presence of free Si in a Si-rich silicon nitride inclusive layer 3 may allow certain atoms such as sodium (Na) which migrate outwardly from the glass 1 during HT to be more efficiently stopped by the Si-rich silicon nitride inclusive layer before they can reach the silver and damage the same. Thus, it is believed that the Si-rich $Si_xN_y$ can reduce the amount of damage done to the silver layer(s) during HT in certain example embodiments of this invention thereby allowing sheet resistance ($R_s$) to decrease or remain about the same in a satisfactory manner. Moreover, it is believed that the Si-rich $Si_xN_y$ in layer 3, 14 and/or 16 can reduce the amount of damage (e.g., oxidation) done to absorbing layer 15 during HT in certain example optional embodiments of this invention.

In certain example embodiments, when Si-rich silicon nitride us used in layer 3, 14 and/or 16, the Si-rich silicon nitride layer as deposited may be characterized by $Si_xN_y$ layer(s), where x/y may be from 0.76 to 1.5, more preferably from 0.8 to 1.4, still more preferably from 0.85 to 1.2. Moreover, in certain example embodiments, before and/or after HT the Si-rich $Si_xN_y$ layer(s) may have an index of refraction "n" of at least 2.05, more preferably of at least 2.07, and sometimes at least 2.10 (e.g., 632 nm) (note: stoichiometric $Si_3N_4$ which may also be used has an index "n" of 2.02-2.04). In certain example embodiments, it has surprisingly been found that improved thermal stability is especially realizable when the Si-rich $Si_xN_y$ layer(s) as deposited has an index of refraction "n" of at least 2.10, more preferably of at least 2.20, and most preferably from 2.2 to 2.4. Also, the Si-rich $Si_xN_y$ layer in certain example embodiments may have an extinction coefficient "k" of at least 0.001, more preferably of at least 0.003 (note: stoichiometric $Si_3N_4$ has an extinction coefficient "k" of effectively 0). Again, in certain example embodiments, it has surprisingly been found that improved thermal stability can be realized when "k" for the Si-rich $Si_xN_y$ layer(s) is from 0.001 to 0.05 as deposited (550 nm). It is noted that n and k tend to drop due to heat treatment.

Any and/or all of the silicon nitride layers discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl in certain embodiments of this invention. Oxygen may also be provided in certain instances in the silicon nitride layers.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers may, however, be slightly oxidized in certain embodiments of this invention. While the FIG. 1 embodiments two IR reflecting layers 9 and 19, it is possible for additional IR reflecting layers (e.g., of or including silver) to be provided in the coating in other example embodiments of this invention.

The upper contact layers 11 and 21 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, $NiCrO_x$ in these layers (11 and/or 21) allows durability to be improved. The $NiCrO_x$ of layers 11 and/or 21 may be fully oxidized in certain embodiments of this invention (i.e., fully stoichiometric), or alternatively may only be partially oxidized. In certain instances, the $NiCrO_x$ layers 11 and/or 21 may be at least about 50% oxidized. Contact layers 11 and/or 21 (e.g., of or including an oxide of Ni and/or Cr) may or may not be oxidation graded in different embodiments of this invention. Oxidation grading means that the degree of oxidation in the layer changes throughout the thickness of the layer so that for example a contact layer may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layers 11 and/or 21 (e.g., of or including an oxide of Ni and/or Cr) may or may not be continuous in different embodiments of this invention across the entire IR reflecting layer.

Dielectric layer 13 may be of or include tin oxide in certain example embodiments of this invention. However, as with other layers herein, other materials may be used in different instances.

Lower contact layers 7 and/or 17 in certain embodiments of this invention are of or include zinc oxide (e.g., ZnO). The zinc oxide of layers 7 and 17 may contain other materials as well such as Al (e.g., to form $ZnAlO_x$). For example, in certain example embodiments of this invention, one or more of zinc oxide layers 7, 17 may be doped with from about 1 to 10% Al, more preferably from about 1 to 5% Al, and most preferably about 1 to 4% Al.

Dielectric layer 23 may be of or include tin oxide in certain example embodiments of this invention. However, layer 23 is optional and need not be provided in certain example embodiments of this invention. Dielectric layer 25, which may be an overcoat in certain example instances, may be of or include silicon nitride (e.g., $Si_3N_4$) or any other suitable material in certain example embodiments of this invention. Optionally, other layers may be provided above layer 25. Layer 25 is provided for durability purposes, and to protect the underlying layers during heat treatment and/or environmental use. In certain example embodiments, layer 25 may have an index of refraction (n) of from about 1.9 to 2.2, more preferably from about 1.95 to 2.05.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

Advantageously, coated articles according to different example embodiments of this invention (e.g., see Examples 1-2 below) are designed and the absorbing layer 15 is located in a position and of a material and thickness so that the coated article realizes a $\Delta E^*$ (glass side reflective) due to heat treatment (e.g., tempering) of no more than 3.0, more preferably no more than 2.5, and most preferably no more than 2.0. It is noted that $\Delta E^*$ is defined in U.S. Pat. No. 6,863,928, for example, the disclosure of which is hereby incorporated herein by reference.

While various thicknesses and materials may be used in layers in different embodiments of this invention, example thicknesses and materials for the respective layers on the glass substrate 1 in the first FIG. 1 embodiment are as follows for an example coated article designed to have a relatively low visible transmission (e.g., about 48-52%) when used in an IG window unit, from the glass substrate outwardly:

Example Materials/Thicknesses; Low Transmission
FIG. 1 Embodiment

| Layer<br>Glass (1-10 mm thick) | Preferred Range (Å) | More Preferred (Å) | Example 1(Å) |
|---|---|---|---|
| $Si_xN_y$ (layer 3) | 200-500 Å | 300-400 Å | 354 Å |
| $ZnO_x$ (layer 7) | 10-300 Å | 40-150 Å | 100 Å |
| Ag (layer 9) | 50-250 Å | 90-120 Å | 110 Å |
| $NiCrO_x$ (layer 11) | 10-100 Å | 12-40 Å | 30 Å |
| $SnO_2$ (layer 13) | 0-1,000 Å | 200-700 Å | 472 Å |
| $Si_xN_y$ (layer 14) | 40-250 Å | 50-200 Å | 120 Å |
| NiCr (layer 15) | 80-140 Å | 90-125 Å | 109 Å |
| $Si_xN_y$ (layer 16) | 40-450 Å | 70-300 Å | 204 Å |
| $ZnO_x$ (layer 17) | 10-300 Å | 40-150 Å | 100 Å |
| Ag (layer 19) | 50-300 Å | 150-250 Å | 207 Å |
| $NiCrO_x$ (layer 21) | 10-100 Å | 20-45 Å | 30 Å |
| $SnO_2$ (layer 23) | 0-750 Å | 40-200 Å | 100 Å |
| $Si_3N_4$ (layer 25) | 0-750 Å | 80-320 Å | 120 Å |

In certain example embodiments of this invention, coated articles herein according to the first or low transmission embodiment may have the following optical and solar characteristics when measured monolithically (after optional HT). The sheet resistances ($R_s$) herein take into account all IR reflecting layers (e.g., silver layers 9, 19).

Optical/Solar Characteristics Low Transmission
Embodiment (Monolithic; Post-HT)

| Characteristic | General | More Preferred | Example 1 |
|---|---|---|---|
| $T_{vis}$ (or TY)(Ill. C 2°): | 48-60% | 52-58% | 54.5% |
| $a*_t$ (Ill. C 2°): | −8 to +1.0 | −6 to −2 | −4.5 |
| $b*_t$ (Ill. C 2°): | −3.0 to +8.0 | −2 to +5 | +0.5 |
| L* (Ill. C 2°): | 70-85 | 75-81 | 78.8 |
| $R_fY$ (Ill. C, 2 deg.): | 10 to 27% | 15 to 23% | 19.5% |
| $a*_f$ (Ill. C, 2°): | −5.0 to +6.0 | −1 to +4 | +2.5 |
| $b*_f$ (Ill. C, 2°): | −10.0 to +25.0 | +10 to +23 | +18 |
| L* (Ill. C 2°): | 40-60 | 46-56 | 51.27 |
| $R_gY$ (Ill. C, 2 deg.): | 10 to 17% | 11 to 16% | 13.5% |
| $a*_g$ (Ill. C, 2°): | −5 to +2.0 | −3 to 0 | −1.5 |
| $b*_g$ (Ill. C, 2°): | −20.0 to +10.0 | −15.0 to −5 | −10.0 |
| L* (Ill. C 2°): | 38-48 | 41-46 | 43.5 |
| Rga* (45°): | 0 to +2 | +0.5 to +1.5 | +1 |
| Rgb* (45°): | −10 to −4 | −9 to −5 | −7 |
| $R_s$ (ohms/sq.): | <=5.0 | <=4.0 | <=3.0 |
| $E_n$: | <=0.07 | <=0.04 | <=0.03 |

Moreover, in certain example of the low transmission embodiments of this invention, coated articles herein which have been heat treated to an extent sufficient for tempering, and which have been coupled to another glass substrate to form an IG unit, may have the following IG unit optical/solar characteristics.

Example Optical Features Low Transmission
Embodiment (IG Unit HT)

| Characteristic | General | More Preferred | Example 1 |
|---|---|---|---|
| $T_{vis}$ (or TY)(Ill. C 2°): | 46-54% | 48-52% | 50% |
| $a*_t$ (Ill. C 2°): | −8 to −3 | −7 to −4 | −5.5 |
| $b*_t$ (Ill. C 2°): | −2 to +6 | 0 to +3 | +1.5 |
| L* (Ill. C 2°): | 72-80 | 74-78 | 76.1 |
| $R_fY$ (Ill. C, 2 deg.): | 17 to 28% | 20 to 25% | 23% |
| $a*_f$ (Ill. C, 2°): | −3 to +5 | −1 to +3 | +1 |
| $b*_f$ (Ill. C, 2°): | 0 to +20 | +5 to +15 | +10 |
| L* (Ill. C 2°): | 52-59 | 53-57 | 55.1 |
| $R_gY$ (Ill. C, 2 deg.): | 11 to 19% | 13 to 17% | 15.5% |
| $a*_g$ (Ill. C, 2°): | −5 to 0 | −4 to −1 | −2.5 |
| $b*_g$ (Ill. C, 2°): | −15 to −4 | −12 to −8 | −10.0 |
| L* (Ill. C 2°): | 42-50 | 44-48 | 46.3 |
| Rga* (45°): | 0 to +2 | +0.5 to +1.5 | +1 |
| Rgb* (45°): | −10 to −4 | −9 to −5 | −7 |
| $R_s$ (ohms/sq.): | <=5.0 | <=4.0 | <=3.0 |
| $E_n$: | <=0.07 | <=0.04 | <=0.03 |

A second embodiment according to FIG. 1 (including Example 2), having a relatively higher visible transmisssion will now be described for purposes of example. While various thicknesses and materials may be used in layers in different embodiments of this invention, example thicknesses and materials for the respective layers on the glass substrate 1 in the second FIG. 1 embodiment are as follows for an example coated article designed to have a relatively high visible transmission (e.g., about 60-64%) when used in an IG window unit, from the glass substrate outwardly:

Example Materials/Thicknesses; High Transmission
FIG. 1 Embodiment

| Layer<br>Glass (1-10 mm thick) | Preferred Range (Å) | More Preferred (Å) | Example 2(Å) |
|---|---|---|---|
| $Si_xN_y$ (layer 3) | 50-400 Å | 100-250 Å | 140 Å |
| $ZnO_x$ (layer 7) | 10-300 Å | 80-150 Å | 110 Å |
| Ag (layer 9) | 50-200 Å | 70-120 Å | 95 Å |

-continued

| Layer<br>Glass (1-10 mm thick) | Preferred Range (Å) | More Preferred (Å) | Example 2(Å) |
|---|---|---|---|
| $NiCrO_x$ (layer 11) | 10-100 Å | 12-40 Å | 30 Å |
| $SnO_2$ (layer 13) | 0-1,000 Å | 200-700 Å | 502 Å |
| $Si_xN_y$ (layer 14) | 40-250 Å | 50-200 Å | 120 Å |
| NiCr (layer 15) | 3-25 Å | 3-15 Å | 5 Å |
| $Si_xN_y$ (layer 16) | 40-450 Å | 70-300 Å | 120 Å |
| $ZnO_x$ (layer 17) | 10-300 Å | 40-150 Å | 100 Å |
| Ag (layer 19) | 50-300 Å | 150-250 Å | 196 Å |
| $NiCrO_x$ (layer 21) | 10-100 Å | 20-45 Å | 30 Å |
| $SnO_2$ (layer 23) | 0-750 Å | 40-200 Å | 130 Å |
| $Si_3N_4$ (layer 25) | 0-750 Å | 80-320 Å | 191 Å |

In certain example embodiments of this invention, coated articles herein according to the second or high transmission embodiment may have the following optical and solar characteristics when measured monolithically (after optional HT). The sheet resistances ($R_s$) herein take into account all IR reflecting layers (e.g., silver layers 9, 19).

Optical/Solar Characteristics High Transmission Embodiment (Monolithic; Post-HT)

| Characteristic | General | More Preferred | Example 2 |
|---|---|---|---|
| $T_{vis}$ (or TY)(Ill. C 2°): | 61-72% | 63-70% | 67.5% |
| $a*_t$ (Ill. C 2°): | −8 to 0 | −6 to −3 | −4.5 |
| $b*_t$ (Ill. C 2°): | −2.0 to +8.0 | 0 to +5 | +3.0 |
| L* (Ill. C 2°): | 81-90 | 83-88 | 85.75 |
| $R_fY$ (Ill. C, 2 deg.): | 8 to 15% | 10 to 13% | 11.5% |
| $a*_f$ (Ill. C, 2°): | −2 to +6 | 0 to +3 | +1.5 |
| $b*_f$ (Ill. C, 2°): | 0 to +25.0 | +8 to +23 | +13 |
| L* (Ill. C 2°): | 36-46 | 38-43 | 40.41 |
| $R_gY$ (Ill. C, 2 deg.): | 8 to 15% | 10 to 13% | 11.5% |
| $a*_g$ (Ill. C, 2°): | −5 to +2.0 | −3 to 0 | −1.0 |
| $b*_g$ (Ill. C, 2°): | −20.0 to +10.0 | −15.0 to −5 | −10.0 |
| L* (Ill. C 2°): | 36-46 | 38-43 | 40.41 |
| Rga* (45°): | 0 to +2 | +0.5 to +1.5 | +1 |
| Rgb* (45°): | −10 to −4 | −9 to −5 | −7 |
| $R_s$ (ohms/sq.): | <=5.0 | <=4.0 | <=3.0 |
| $E_n$: | <=0.07 | <=0.04 | <=0.03 |

Moreover, in certain example of the high transmission embodiments of this invention, coated articles herein which have been heat treated to an extent sufficient for tempering, and which have been coupled to another glass substrate to form an IG unit, may have the following IG unit optical/solar characteristics.

Example Optical Features High Transmission Embodiment (IG Unit HT)

| Characteristic | General | More Preferred | Example 2 |
|---|---|---|---|
| $T_{vis}$ (or TY)(Ill. C 2°): | 56-68% | 60-64% | 62% |
| $a*_t$ (Ill. C 2°): | −8 to −2 | −7 to −3 | −5 |
| $b*_t$ (Ill. C 2°): | 0 to +7 | +2 to +5 | +3.5 |
| L* (Ill. C 2°): | 78-88 | 81-85 | 82.9 |
| $R_fY$ (Ill. C, 2 deg.): | 13 to 23% | 15 to 19% | 17% |
| $a*_f$ (Ill. C, 2°): | −3 to +5 | −1 to +2 | +0.5 |
| $b*_f$ (Ill. C, 2°): | 0 to +20 | +3 to +11 | +6.5 |
| L* (Ill. C 2°): | 44-54 | 46-51 | 48.3 |
| $R_gY$ (Ill. C, 2 deg.): | 11 to 19% | 13 to 17% | 15% |

-continued

| Characteristic | General | More Preferred | Example 2 |
|---|---|---|---|
| $a*_g$ (Ill. C, 2°): | −5 to 0 | −4 to −1 | −2.5 |
| $b*_g$ (Ill. C, 2°): | −15 to 0 | −10 to −6 | −8.0 |
| L* (Ill. C 2°): | 40-51 | 43-48 | 45.6 |
| Rga* (45°): | 0 to +2 | +0.5 to +1.5 | +1 |
| Rgb* (45°): | −10 to −4 | −9 to −5 | −7 |
| $R_s$ (ohms/sq.): | <=5.0 | <=4.0 | <=3.0 |
| $E_n$: | <=0.07 | <=0.04 | <=0.03 |

The following examples (see above also, as explained below) are provided for purposes of example only, and are not intended to be limiting unless specifically claimed.

EXAMPLES

Examples of this invention have been made. In particular, Examples 1 and 2 of this invention used 6 mm thick clear glass as the substrate and have been made and have the features set forth in the Example columns in the charts above (see Examples 1 and 2 in the charts/tables above), for both the high transmission and low transmission embodiments. Thus, when compared with the Comparative Examples below, it will be seen that the location of the absorbing layer 15 in the middle section of the stack, at desired thicknesses, surprisingly resulted in more desirable bluish (and not too red) glass side reflective coloration at off-axis viewing angles such as about 45 degrees which is desirable in certain applications. See the desirable Rga* (45°) and Rgb* (45°) values above in the charts/tables for Examples 1 and 2. In particular, not the desirable glass side reflective off-axis blue coloration Rgb* (45°) of from about −10 to −4, more preferably from about −9 to −5, and most preferably about −7. Also note the off-axis desirable glass side reflective not-too-red coloration of Rga* (45°) of from about 0 to +2, more preferably from about +0.5 to +1.5, and most preferably about +1.

In other examples similar to FIG. 1, a high transmission example realized a Rga* (45°) of +3.5 and a Rgb* (45°) of −10.6, and a low transmission example realized a Rga* (45°) of −1.2 and a Rgb* (45°) of −10.9. Thus, for any example embodiment of this invention, Rga* (45°) may be from about −2 to +4, more preferably from about 0 to +2, even more preferably from about +0.5 to +1.5.

COMPARATIVE EXAMPLES

The following Comparative Examples were made via sputtering on 6 mm thick clear glass substrates so as to have approximately the layer stack set forth below. Comparative Example 1 is according to an example embodiment in Ser.

No. 11/522,512 whereas the modeled Comparative Example 2 had no NiCr absorbing layer and was provided for purposes of comparison. Comparative Example 1 had approximately the following layer stack, where the thicknesses are in units of angstroms (Å).

| Layer<br>Glass (6 mm thick) | Thickness (Å) |
|---|---|
| $Si_xN_y$ (layer 3) | 124 Å |
| NiCr (layer 4) | 25 Å |
| $Si_xN_y$ (layer 5) | 200 Å |
| $ZnO_x$ (layer 7) | 110 Å |
| Ag (layer 9) | 119 Å |
| $NiCrO_x$ (layer 11) | 30 Å |
| $SnO_2$ (layer 13) | 442 Å |
| $Si_xN_y$ (layer 14) | 125 Å |
| $SnO_2$ (layer 15) | 100 Å |
| $ZnO_x$ (layer 17) | 100 Å |
| Ag (layer 19) | 155 Å |
| $NiCrO_x$ (layer 21) | 30 Å |
| $SnO_2$ (layer 23) | 70 Å |
| $Si_3N_4$ (layer 25) | 302 Å |

Note that the NiCr absorbing layer was in the bottom part of the stack, which is different than in the FIG. 1 embodiments of this invention. Because the NiCr absorbing layer was located in the bottom part of the layer stack, the color ended up being undesirable for certain applications. In particular, because the NiCr absorbing layer was in the bottom portion of the layer stack, the glass side reflective color at the 45 degree viewing angle (i.e., 45 degrees from normal) was undesirable. In particular, the off-axis 45 degree viewing angle provided a glass side reflective a* value (Rga* (45°)) that was too negative, and a glass side reflective b* value (Rgb* (45°)) that was not blue enough (i.e., not negative enough)—see below. Comparative Example 1 was heat treated for tempering, and had the following characteristics measured monolithically (note that glass side reflective monolithic measurements are comparable to glass side reflective IG unit measurements where the coating is provided on the interior surface of the outer glass substrate as in the Examples herein).

| Characteristic | Comparative Ex. 1 (HT) |
|---|---|
| $T_{vis}$ (or TY)(Ill. C 2°): | 59% |
| $a*_t$ (Ill. C 2°): | −4.47 |
| $b*_t$ (Ill. C 2°): | 0.58 |
| $R_fY$ (Ill. C, 2 deg.): | 11.63% |
| $a*_f$ (Ill. C, 2°): | −10.59 |
| $b*_f$ (Ill. C, 2°): | −1.58 |
| $R_gY$ (Ill. C, 2 deg.): | 12.62% |
| $a*_g$ (Ill. C, 2°): | −0.79 |
| $b*_g$ (Ill. C, 2°): | −2.81 |
| Rga* (45°): | −1.50 |
| Rgb* (45°): | −2.92 |
| $R_s$ (ohms/square): | 1.29 |

Comparative Example 2 was essentially the same as Comparative Example 1, but did not have the NiCr layer. In contrast to the Rga* (45°) value of −1.50 of Example 1, the CE had a Rga* (45°) value of +5 which is too red.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising:
at least first and second infrared (IR) reflecting layers, wherein said IR reflecting layers are spaced apart from one another, and wherein the first IR reflecting layer is located closer to the glass substrate than is the second IR reflecting layer;
a substantially metallic absorbing layer located between the first and second IR reflecting layers, wherein the absorbing layer is sandwiched between and contacting first and second dielectric layers which are also located between the first and second IR reflecting layers, and wherein the absorbing layer is from about 80 to 130 Å thick and is located between the first and second IR reflecting layers so that no substantially metallic absorbing layer is located between the glass substrate and the first IR reflecting layer or above the second IR reflecting layer.

2. The coated article of claim 1, wherein the substantially metallic absorbing layer is from about 3-25 angstroms (Å) thick.

3. The coated article of claim 1, wherein the coated article is heat treated.

4. The coated article of claim 3, wherein the coated article has a ΔE* (glass side reflective) due to heat treatment of no more than 2.5.

5. The coated article of claim 1, wherein the substantially metallic absorbing layer is located in the coating so that the coated article has a glass side reflective a* color value of from about −2 to +4 at a 45 degree viewing angle from normal, and a glass side reflective b* color value of from about −10 to −4 at the 45 degree viewing angle from normal.

6. The coated article of claim 1, wherein the first and second IR reflecting layers comprise silver.

7. The coated article of claim 1, wherein the first and second dielectric layers comprise silicon nitride.

8. The coated article of claim 1, wherein the substantially metallic absorbing layer is located in the coating so that the coated article has a glass side reflective a* color value of from about +0.5 to +1.5 at the 45 degree viewing angle from normal, and a glass side reflective b* color value of from about −9 to −5 at the 45 degree viewing angle from normal.

9. The coated article of claim 1, wherein the substantially metallic absorbing layer is located in the coating so that the coated article has a glass side reflective a* color value of about +1 at the 45 degree viewing angle from normal, and/or a glass side reflective b* color value of about −7 at the 45 degree viewing angle from normal.

10. The coated article of claim 1, wherein the substantially metallic absorbing layer is located in the coating so that the coated article has a glass side reflective b* color value of from about −8 to −6 at the 45 degree viewing angle from normal.

11. The coated article of claim 1, wherein said second dielectric layer comprises silicon nitride and is located over the absorbing layer, and wherein a layer comprising zinc oxide is located on and contacting the second dielectric layer comprising silicon nitride, and wherein the layer comprising zinc oxide is located under and contacting the second IR reflecting layer, and wherein the first and second IR reflecting layers comprise silver.

12. The coated article of claim 1, wherein at least a layer comprising silicon nitride and a layer comprising zinc oxide are located between the first IR reflecting layer and the glass substrate.

13. The coated article of claim 1, wherein the coated article comprises an IG window unit and the glass side reflective a* and b* color values are measured in the context of the IG window unit.

14. The coated article of claim 1, wherein the glass side reflective a* and b* color values are measured monolithically following heat treatment.

15. The coated article of claim 1, wherein the substantially metallic absorbing layer is from about 90-125 angstroms (Å) thick.

16. The coated article of claim 1, wherein said coated article has a visible transmission of from about 52-58% or 63-70%, measured monolithically.

17. The coated article of claim 1, wherein said coated article is an IG window unit having a visible transmission of from about 40-65% and has an SHGC of no greater than 0.30.

* * * * *